(12) United States Patent
Liu

(10) Patent No.: US 12,213,847 B2
(45) Date of Patent: Feb. 4, 2025

(54) WATER PUMP CONNECTING STRUCTURE FOR ORAL IRRIGATOR AND ORAL IRRIGATOR COMPRISING THE SAME

(71) Applicant: FLY CAT ELECTRICAL CO., LTD., Guangdong (CN)

(72) Inventor: Xinquan Liu, Guangdong (CN)

(73) Assignee: FLY CAT ELECTRICAL CO., LTD., Guangdong (CN)

( * ) Notice: Subject to any disclaimer, the term of this patent is extended or adjusted under 35 U.S.C. 154(b) by 337 days.

(21) Appl. No.: 17/731,871

(22) Filed: Apr. 28, 2022

(65) Prior Publication Data

US 2023/0240795 A1    Aug. 3, 2023

(30) Foreign Application Priority Data

Jan. 28, 2022 (CN) .......................... 202210105684.6

(51) Int. Cl.
    *A61C 1/00*      (2006.01)
    *A61C 17/02*      (2006.01)

(52) U.S. Cl.
    CPC ........ *A61C 1/0092* (2013.01); *A61C 17/0205* (2013.01)

(58) Field of Classification Search
    CPC .... A61C 1/0092; A61C 17/0202; A61C 17/00
    USPC ......................................................... 433/84
    See application file for complete search history.

(56) References Cited

U.S. PATENT DOCUMENTS

| | | | | |
|---|---|---|---|---|
| 4,229,634 A | * | 10/1980 | Hickman | H01H 9/04 310/43 |
| 4,302,186 A | * | 11/1981 | Cammack | A61C 17/02 601/162 |
| 4,824,368 A | * | 4/1989 | Hickman | A61C 1/0092 433/80 |
| 5,634,791 A | * | 6/1997 | Matsuura | A61C 17/0202 433/88 |
| 2010/0209870 A1 | * | 8/2010 | Thomas | A61C 17/0205 433/89 |
| 2017/0049530 A1 | * | 2/2017 | Cacka | A61H 13/005 |
| 2018/0085189 A1 | * | 3/2018 | Benning | B05B 9/0861 |
| 2020/0229906 A1 | * | 7/2020 | Taniguchi | A61C 17/0202 |

(Continued)

FOREIGN PATENT DOCUMENTS

| | | | | |
|---|---|---|---|---|
| CN | 111946581 A | * | 11/2020 | ......... A61C 1/0092 |
| DE | 3801097 A | * | 7/1989 | ......... A61C 1/0092 |

*Primary Examiner* — Matthew M Nelson
(74) *Attorney, Agent, or Firm* — CANTOR COLBURN LLP

(57) ABSTRACT

A water pump connecting structure for an oral irrigator, including: a pump body, a piston ring, a connecting rod assembly, and a driving assembly. The piston ring is arranged on the inner side wall of the pump body, the connecting rod assembly penetrates into the pump body and penetrates through the piston ring. The piston ring is in interference connection with the connecting rod assembly. The connecting rod assembly is connected to the driving assembly and makes reciprocating motion in the pump body through the driving of the driving assembly and the guidance of the piston ring. The connecting rod assembly and the piston ring are configured to cooperate with each other to draw liquid from a water inlet of the pump body and to pump the liquid out from a water outlet of the pump body, during reciprocating motion of the connecting rod assembly.

18 Claims, 2 Drawing Sheets

(56) References Cited

U.S. PATENT DOCUMENTS

| | | | |
|---|---|---|---|
| 2021/0275278 A1* | 9/2021 | Yuan | A61C 1/0084 |
| 2022/0079708 A1* | 3/2022 | Zhang | A61C 17/0202 |
| 2022/0175502 A1* | 6/2022 | Albright | A61C 17/0205 |
| 2023/0240795 A1* | 8/2023 | Liu | A61C 1/0092 |
| | | | 433/84 |

* cited by examiner

WATER PUMP CONNECTING STRUCTURE FOR ORAL IRRIGATOR AND ORAL IRRIGATOR COMPRISING THE SAME

CROSS-REFERENCE TO RELATED APPLICATIONS

Pursuant to 35 U.S.C. § 119 and the Paris Convention, this application claims the benefit of Chinese Patent Application No. 202210105684.6 filed Jan. 28, 2022, the contents of which are incorporated herein by reference.

TECHNICAL FIELD

The present application relates to the technical field of an oral irrigator, and in particular, to a water pump connecting structure for an oral irrigator and an oral irrigator comprising the same.

BACKGROUND

An oral irrigator is a kind of oral cleaning product, mainly including a water pump, a water storage tank, and a nozzle. Liquid in the water storage tank is pumped by the water pump and is sprayed out through the nozzle, thereby achieving the aim of washing teeth. Oral irrigator water pumps on the current market generally adopt piston connecting rod motion structures or diaphragm pump structures.

The piston connecting rod motion structure has the advantages of high transmission efficiency, low kinetic energy loss, and the like, but has the following disadvantages: 1. The piston may bring water out of the pump body when performing reciprocating motion in the pump body, resulting in that water in the pump body enters a motor, a printed circuit board (PCB), and a battery to cause short circuit, so the service life of the oral irrigator is generally not long. 2. When the piston makes reciprocating motion in the pump body, it is necessary to reduce high-frequency friction force between the outer wall of the piston and the inner wall of the pump body, so high requirements are provided on the material property and fatigue resistance of the piston and the pump body.

The application of the diaphragm pump technology has solved some of the above technical problems. However, the manufacturing process of the diaphragm is generally silicone rubber injection molding, which is affected by the flowability and pressure in the injection molding process. Each diaphragm part has great inter-individual difference and different fatigue resistances. Due to the larger number of diaphragms formed in the same batch, it is difficult to ensure the consistency and stability of the product quality. Once the diaphragm is broken, water in the pump body will enter the motor, the PCB, and the battery to cause short circuit, thereby affecting the use of products.

SUMMARY

In view of the problems, the present application provides a water pump connecting structure for an oral irrigator and an oral irrigator so as to overcome the problems or at least partially solve the problem.

A water pump connecting structure for an oral irrigator includes: a pump body, a piston ring, a connecting rod assembly, and a driving assembly.

The piston ring is arranged on an inner side wall of the pump body. The connecting rod assembly penetrates into the pump body and penetrates through the piston ring; the piston ring is in interference connection with the connecting rod assembly.

The connecting rod assembly is connected to the driving assembly, and is configured to make reciprocating motion in the pump body through the driving of the driving assembly and the guidance of the piston ring.

The connecting rod assembly and the piston ring are configured to cooperate with each other to draw liquid from a water inlet of the pump body and to pump the liquid out from a water outlet of the pump body, during reciprocating motion of the connecting rod assembly.

Preferably, the piston ring includes at least two guide rings. Each of the at least two guide rings is in interference connection with the connecting rod assembly. The connecting rod assembly is configured to make the reciprocating motion in the pump body under the guidance of the at least two guide rings.

Preferably, the piston ring further includes an outer ring. Each of the at least two guide rings includes a connection portion and an extension portion; the connection portion is connected to an inner side of the outer ring. The extension portion extends from an inner side of a connection portion to the direction adjacent to the guide ring.

Preferably, an inner diameter of the connecting rod assembly is smaller than an inner diameter of the pump body.

Preferably, the connecting rod assembly includes a first connecting rod and a second connecting rod. One end of the first connecting rod is connected to an output end of the driving assembly and the other end of the first connecting rod is connected to an end part of the second connecting rod through a ball head. The second connecting rod penetrates into the pump body and penetrates through the piston ring. The second connecting rod is in interference connection with the piston ring.

Preferably, the ball head is arranged at an end part of the first connecting rod; a groove matched with the shape of the ball head is arranged at the end part of the second connecting rod; and the ball head is clamped in the groove;

or the ball head is arranged at the end part of the second connecting rod, a groove matched with the shape of the ball head is arranged at an end part of the first connecting rod, and the ball head is clamped in the groove.

Preferably, the driving assembly includes a motor, a motor gear, a transmission gear and a cam. The motor gear is fixed on an output shaft of the motor; the transmission gear is in engaged connection with the motor gear. The cam is fixed on an end face of the transmission gear. An end part of the first connecting rod is in transmission connection with the cam.

Preferably, the water pump connecting structure for an oral irrigator further includes a steel sleeve. The steel sleeve is arranged on the inner side wall of the pump body. The connecting rod assembly is in sliding connection with the steel sleeve.

Further, the pump body includes a first assembling piece and a second assembling piece. The first assembling piece and the second assembling piece are of hollow cylinder structures respectively. The first assembling piece is connected to the end part of the second assembling piece. The water outlet is formed at an end part of the second assembling piece away from the first assembling piece. The water inlet is formed at a side of the second assembling piece.

A recessed portion is arranged on an end face of the first assembling piece facing towards the second assembling piece. A protruded portion is arranged on an end face of the second assembling piece facing towards the first assembling piece. The piston ring and the protruded portion are arranged in the recessed portion respectively.

An oral irrigator includes: a shell, a bracket, a nozzle, a water storage tank, a water inlet pipe and the water pump connecting structure for an oral irrigator as defined in any one of the above, the nozzle and the water storage tank are arranged at an end part of the shell respectively. The bracket is fixed in the shell; the water pump connecting structure for an oral irrigator is mounted on the bracket. The pump body is connected to the water inlet pipe and the nozzle respectively. The water inlet pipe is connected to the water storage tank.

The present application has the following advantages:

In the embodiments of the present application, through the pump body, the piston ring, the connecting rod assembly and the driving assembly, the piston ring is arranged on the inner side wall of the pump body. The connecting rod assembly penetrates into the pump body and penetrates through the piston ring. The piston ring is in interference connection with the connecting rod assembly. The connecting rod assembly is connected to the driving assembly and makes reciprocating motion in the pump body through the driving of the driving assembly and the guidance of the piston ring. The connecting rod assembly and the piston ring are configured to cooperate with each other to draw liquid from a water inlet of the pump body and to pump the liquid out from a water outlet of the pump body, during reciprocating motion of the connecting rod assembly. The piston ring not only can play a better supporting and guide role in the connecting rod assembly, but also has high sealing property, and can prevent the connecting rod assembly from bringing out the liquid in the reciprocating motion process.

BRIEF DESCRIPTION OF DRAWINGS

In order to describe the technical solutions in the embodiments of the present application more clearly, the following briefly introduces the accompanying drawings required for describing the present application. Apparently, the accompanying drawings in the following description show merely some embodiments of the present application, and a person of ordinary skill in the art may also derive other drawings from these accompanying drawings without creative efforts.

Figure 1:
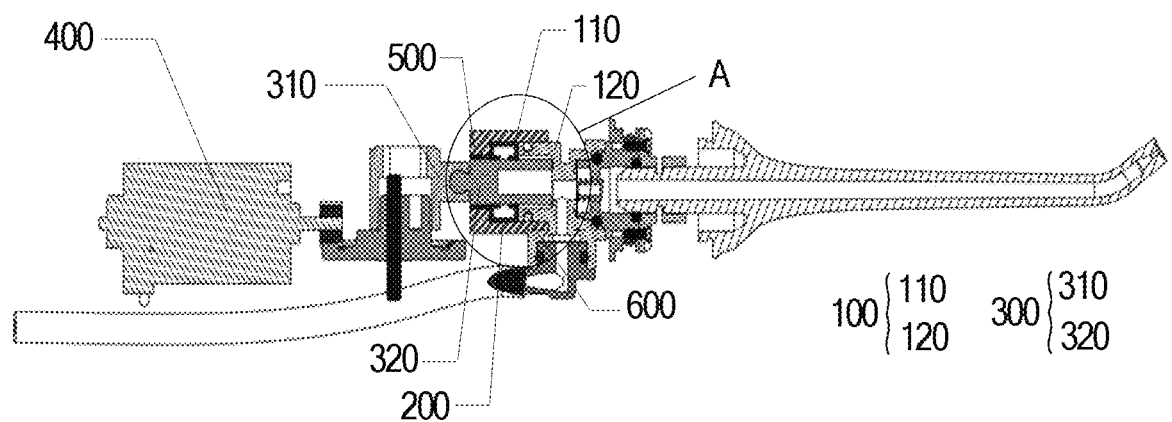
FIG. 1 is a structural schematic diagram of a water pump connecting structure for an oral irrigator according to an embodiment of the present application in a first state.

Reference numerals in the drawings are as follows:
100. Pump body; 110. First assembling piece; 120. Second assembling piece; 200. Piston ring; 210. Outer ring; 220. Connection portion; 230. Extension portion; 300. Connecting rod assembly; 310. First connecting rod; 320. Second connecting rod; 400. Driving assembly; 500. Steel sleeve; and 600. Sealing ring.

DETAILED DESCRIPTION OF EMBODIMENTS

To make the objectives, features, and advantages of this application more obvious and easier to understand, this application will be further described in detail with reference to the accompanying drawings and the detailed description. Apparently, the described embodiments are merely some than all of the embodiments of the present application. All other embodiments obtained by those of ordinary skill in the art based on the embodiments in the present application without creative efforts should fall within the protection scope of the present application.

Figure 2:
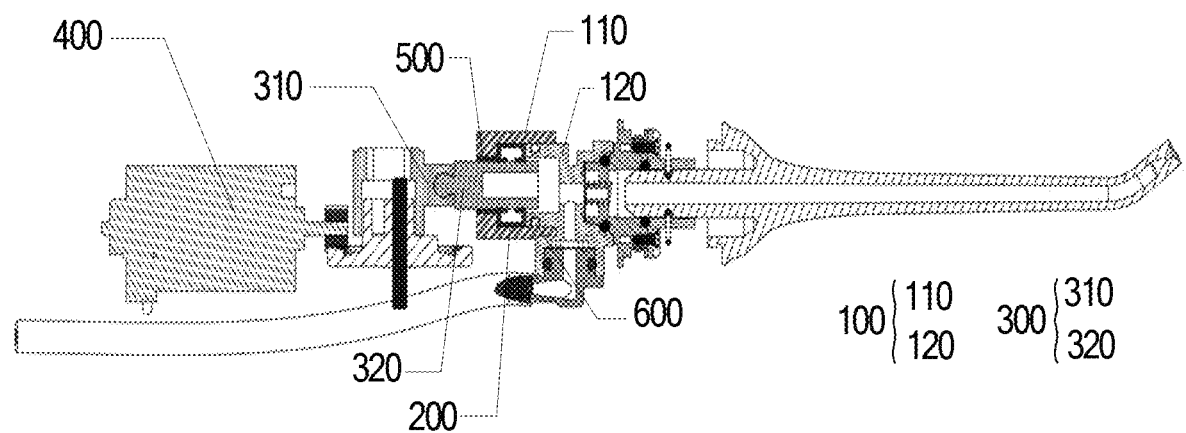
FIG. 2 is a structural schematic diagram of a water pump connecting structure for an oral irrigator according to an embodiment of the present application in a second state.
Figure 3:
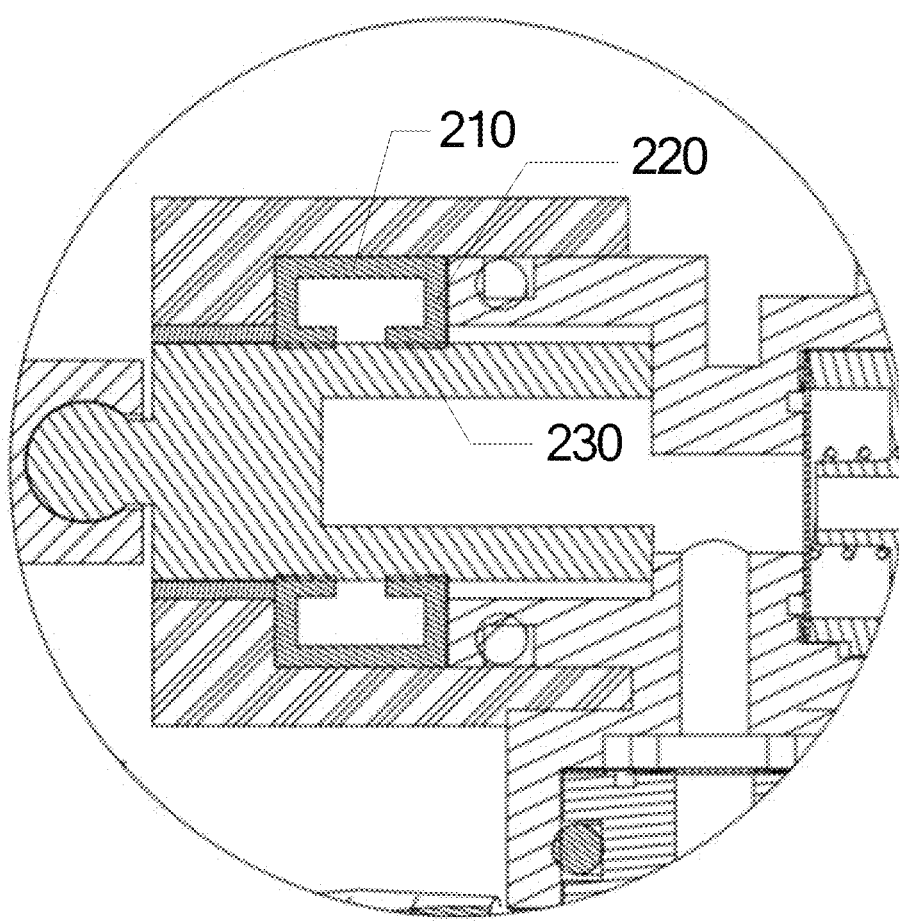
FIG. 3 is a partially enlarged schematic diagram of Part A in FIG. 1.

Referring to FIG. 1 to FIG. 3, they are a water pump connecting structure for an oral irrigator according to an embodiment of the present application. The water pump connecting structure for an oral irrigator includes: a pump body 100, a piston ring 200, a connecting rod assembly 300, and a driving assembly 400.

The piston ring 200 is arranged on the inner side wall of the pump body 100; the connecting rod assembly 300 penetrates into the pump body 100 and penetrates through the piston ring 200. The piston ring is in interference connection with the connecting rod assembly 300.

The connecting rod assembly 300 is connected to the driving assembly 400, and makes reciprocating motion in the pump body 100 through the driving of the driving assembly 400 and the guidance of the piston ring 200.

When the connecting rod assembly 300 makes reciprocating motion, the connecting rod assembly 300 and the piston ring 200 cooperate with each other to draw liquid from a water inlet of the pump body 100 and to pump the liquid out from a water outlet of the pump body 100.

In the embodiments of the present application, through the pump body 100, the piston ring 200, the connecting rod assembly 300 and the driving assembly 400, the piston ring 200 is arranged on the inner side wall of the pump body 100. The connecting rod assembly 300 penetrates into the pump body 100 and penetrates through the piston ring 200. The piston ring 200 is in interference connection with the connecting rod assembly 300. The connecting rod assembly 300 is connected to the driving assembly 400 and makes reciprocating motion in the pump body 100 through the driving of the driving assembly 400 and the guidance of the piston ring 200. When the connecting rod assembly 300 makes reciprocating motion, the connecting rod assembly 300 and the piston ring 200 cooperate with each other to draw liquid from a water inlet of the pump body 100 and to pump the liquid out from a water outlet of the pump body 100. The piston ring 200 not only can play a better supporting and guide role in the connecting rod assembly 300, but also has high sealing property, and can prevent the connecting rod assembly 300 from bringing out the liquid in the reciprocating motion process.

One oral irrigator water pump connecting structure in this exemplary embodiment is further described below.

In this embodiment, the piston ring 200 includes at least two guide rings. Each of the at least two guide rings is in inference connection with the connecting rod assembly respectively. The connecting rod assembly 300 makes reciprocating motion in the pump body 100 under the guidance of the at least two guide rings. At least two guide rings may be arranged on the inner side wall of the pump body 100 equidistantly or randomly dispersedly, different guide rings have the same shape or different shapes, and the shapes and the arrangement modes of the guide rings are not limited in the present application.

In this embodiment, the piston ring 200 further includes an outer ring 210. The guide ring includes a connection portion 220 and an extension portion 230. The connection portion 220 is connected to an inner side of the outer ring 210. The extension portion 230 extends to a direction adjacent to the guide ring from the inner side of the connection portion 220. Specifically, two guide rings are provided, and the two guide rings are arranged on the end part of the inner side of the outer ring 210 respectively. An axial cross section of the guide ring is L-shaped, a first side of the L shape corresponding to the connection portion 220 is perpendicular to the reciprocating motion direction of the connecting rod assembly 300, and a second side of the L shape corresponding to the extension portion 230 is parallel with the reciprocating motion direction of the connecting rod assembly 300. The inner diameter (that is, the inner diameter of the extension portion 230) of the piston ring 200 in a natural state is smaller than the inner diameter of the connecting rod assembly 300, which can meet that the piston ring 200 is in interference connection with the connecting rod assembly 300 after the overall structure is assembled. The piston ring 200 has two contact surfaces (that is, the inner side surfaces of the extension portion 230) which are in interference connection with the connecting rod assembly 300, which may play a better supporting and guide role. Furthermore, the structural form of the piston ring 200 can always compensate the generated wear so as to play a good sealing role and prevent the connecting rod assembly 300 from bringing out the liquid in the reciprocating motion process.

In this embodiment, the outer ring 210 is integrally connected to the at least two guide rings. The piston ring 200 is integrally formed through an injection molding process, has high structural stability and is simple and convenient to assemble.

In this embodiment, the inner diameter of the connecting rod assembly 300 is smaller than the inner diameter of the pump body 100. There is a gap between the connecting rod assembly 300 and the inner wall of the pump body 100, which can prevent the connecting rod assembly 300 from being in contact with the inner wall of the pump body 100 in the reciprocating motion process, thereby reducing frictional loss.

In this embodiment, the connecting rod assembly 300 includes a first connecting rod 310 and a second connecting rod 320. One end of the first connecting rod 310 is connected to an output end of the driving assembly 400 and the other end of the first connecting rod 310 is connected to the end part of the second connecting rod 320 through a ball head. The second connecting rod 320 penetrates into the pump body 100 and penetrates through the piston ring 200. The second connecting rod 320 is in interference connection with the piston ring. The ball head has a good guide function, can convert the rotating motion of the driving assembly 400 into the reciprocating motion of the second connecting rod 320, has high kinetic energy conversion rate, and can reduce the influence on the reciprocating motion of the second connecting rod 320 by the radial swing of the first connecting rod 310.

In this embodiment, the ball head is arranged at an end part of the first connecting rod 310, a groove matched with the shaped of the ball head is formed at an end part of the second connecting rod 320, and the ball head is clamped in the groove. Or alternatively, the ball head is arranged at an end part of the second connecting rod 320, a groove matched with the shape of the ball head is formed at an end part of the first connecting rod 310, and the ball head is clamped in the groove. The ball head may be connected to the end part of any one of the first connecting rod 310 and the second connecting rod 320, and the arrangement mode of the ball head is not limited in the present application.

In this embodiment, the driving assembly 400 includes: a motor, a motor gear, a transmission gear, and a cam. The motor gear is fixed on an output shaft of the motor. The transmission gear is in engaged connection with the motor gear. The cam is fixed on an end face of the transmission gear. The end part of the first connecting rod 310 is in transmission connection with the cam.

When the motor gear rotates under the driving of the motor, the transmission gear is driven by the motor gear to rotate, the cam is driven by the transmission gear to rotate, the first connecting rod 310 is driven by the cam to swing, and the second connecting rod 320 is driven by the first connecting rod 310 to do reciprocating motion along the axial direction of the pump body 100.

In this embodiment, the water pump connecting structure for an oral irrigator further includes a steel sleeve 500. The steel sleeve 500 is arranged on the inner side wall of the pump body 100. The connecting rod assembly 300 is in sliding connection with the steel sleeve 500. Specifically, the steel sleeve 500 has a tubular structure, and the steel sleeve 500 is attached to the inner wall of the pump body 100. The steel sleeve 500 may further play a supporting and guide role, and has a small contact friction force with the connecting rod assembly 300 and small frictional loss.

In this embodiment, the pump body 100 includes a first assembling piece 110 and a second assembling piece 120. The first assembling piece 110 and the second assembling piece 120 respectively have hollow cylindrical structures. The first assembling piece 110 is connected to the end part of the second assembling piece 120. The water outlet is formed at an end part of the second assembling piece 120 away from the first assembling piece 110. The water inlet is formed at a side of the second assembling piece 120.

A recessed portion is arranged on an end face of the first assembling piece 110 facing towards the second assembling piece 120. A protruded portion is arranged on an end face of the second assembling piece 120 facing towards the first assembling piece 110. The piston ring 200 and the protruded portion are arranged in the recessed portion respectively.

Specifically, the protruded portion tightly presses the piston ring 200 in the recessed portion. The water inlet is connected to the water storage tank through a water inlet pipe; and the water outlet is connected to the nozzle through a pipe base. The internal space of the first assembling piece 110 and the second assembling piece 120 forms a volume cavity; and when the second connecting rod 320 is driven by the first connecting rod 310 to do reciprocating motion along the axial direction of the pump body 100, liquid in the water storage tank enters the volume cavity through the water inlet, and then is discharged to the nozzle through the water outlet under the pumping and suction action of the second connecting rod 320.

In this embodiment, the water pump connecting structure for an oral irrigator further includes a sealing ring 600. The sealing ring 600 is arranged between the first assembling piece 110 and the second assembling piece 120. The sealing ring 600 can improve the sealing property between the first assembling piece 110 and the second assembling piece 120 so as to prevent the liquid from leaking out.

In one embodiment of the present application, an oral irrigator is further provided. The oral irrigator includes a shell, a bracket, a nozzle, a pipe base, a water storage tank, a water inlet pipe and the water pump connecting structure defined as any one of the above. The nozzle is arranged at one end of the shell through the pipe base, and the water storage tank is arranged at the other end of the shell. The bracket is fixed in the shell; the water pump connecting structure is mounted on the bracket. The pump body 100 is connected to the water inlet pipe and the pipe base respectively. The water inlet pipe is connected to the water storage tank. The oral irrigator has a simple overall structure, small occupied space, a simple manufacturing process, and high consistency and stability of the product quality.

Although preferred embodiments of the present application have been described, those skilled in the art may make additional changes and modifications to these embodiments once they learn the basic inventive concept. Therefore, the appended claims are intended to be construed as to include the preferred embodiments and all changes and modifications falling within the scope of the present application.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. In absence of more constraints, an element preceded by "includes a . . . " does not preclude the existence of other identical elements in the process, method, article, or terminal device that includes the element.

The water pump connecting structure for an oral irrigator and the oral irrigator provided by the present application are described above in detail. Specific examples are used for illustration of the principles and implementation manners of the present application. The description of the above examples is used to help understand the method and its core concept of the present application. Those skilled in the art can make various variations to the specific implementation manner and application scope according to the concept of the preset application. The content of the specification should not be understood a limitation to the present application.

What is claimed is:

1. A water pump connecting structure for an oral irrigator, comprising: a pump body, a piston ring, a connecting rod assembly, and a driving assembly;
wherein
the piston ring is arranged on an inner side wall of the pump body; the connecting rod assembly penetrates into the pump body and penetrates through the piston ring; the piston ring is in interference connection with the connecting rod assembly;
the connecting rod assembly is connected to the driving assembly, and is configured to make reciprocating motion in the pump body through the driving of the driving assembly and guidance of the piston ring;
the connecting rod assembly and the piston ring are configured to cooperate with each other to draw liquid from a water inlet of the pump body and to pump the liquid out from a water outlet of the pump body, during reciprocating motion of the connecting rod assembly; and
the piston ring comprises at least two guide rings and an outer ring, each of the at least two guide rings comprises a connection portion and an extension portion; the connection portion is connected to an inner side of the outer ring and the extension portion is configured to be extended towards an adjacent guide ring from an inner side of the connection portion; and an axial cross section of each of the at least two guide rings is L-shaped.

2. The water pump connecting structure for an oral irrigator according to claim 1, wherein
each of the at least two guide rings is in interference connection with the connecting rod assembly; and
the connecting rod assembly is configured to make the reciprocating motion in the pump body under guidance of the at least two guide rings.

3. The water pump connecting structure for an oral irrigator according to claim 1, wherein an inner diameter of the connecting rod assembly is smaller than an inner diameter of the pump body.

4. The water pump connecting structure for an oral irrigator according to claim 1, wherein
the connecting rod assembly comprises a first connecting rod and a second connecting rod;
one end of the first connecting rod is connected to an output end of the driving assembly and an other end of the first connecting rod is connected to an end part of the second connecting rod through a ball head;
the second connecting rod penetrates into the pump body and penetrates through the piston ring; and
the second connecting rod is in interference connection with the piston ring.

5. The water pump connecting structure for an oral irrigator according to claim 4, wherein
the ball head is arranged at an end part of the first connecting rod, a groove matched with a shape of the ball head is arranged at the end part of the second connecting rod, and the ball head is clamped in the groove;
or
the ball head is arranged at the end part of the second connecting rod, a groove matched with the shape of the ball head is arranged at an end part of the first connecting rod, and the ball head is clamped in the groove.

6. The water pump connecting structure for an oral irrigator according to claim 4, wherein
the driving assembly comprises: a motor, a motor gear, a transmission gear, and a cam;
the motor gear is fixed on an output shaft of the motor;
the transmission gear is in engaged connection with the motor gear;
the cam is fixed on an end face of the transmission gear; and
an end part of the first connecting rod is in transmission connection with the cam.

7. The water pump connecting structure for an oral irrigator according to claim 6, further comprising a steel sleeve, wherein the steel sleeve is arranged on the inner side wall of the pump body; and the connecting rod assembly is in sliding connection with the steel sleeve.

8. The water pump connecting structure for an oral irrigator according to claim 1, further comprising a steel sleeve, wherein the steel sleeve is arranged on the inner side wall of the pump body; and the connecting rod assembly is in sliding connection with the steel sleeve.

9. The water pump connecting structure for an oral irrigator according to claim 1, wherein
the pump body comprises a first assembling piece and a second assembling piece;
the first assembling piece and the second assembling piece are of hollow cylinder structures, respectively;
the first assembling piece is connected to an end part of the second assembling piece;
the water outlet is formed at an end part of the second assembling piece away from the first assembling piece;

the water inlet is formed at a side of the second assembling piece;
a recessed portion is arranged on an end face of the first assembling piece facing towards the second assembling piece;
a protruded portion is arranged on an end face of the second assembling piece facing towards the first assembling piece; and
the piston ring and the protruded portion are arranged in the recessed portion respectively.

10. An oral irrigator, comprising: a shell, a bracket, a nozzle, a water storage tank, a water inlet pipe, and a water pump connecting structure, wherein
the nozzle and the water storage tank are arranged at end parts of the shell respectively; the bracket is fixed in the shell;
the water pump connecting structure is mounted on the bracket;
a pump body is connected to the water inlet pipe and the nozzle respectively; and
the water inlet pipe is connected to the water storage tank;
the water pump connecting structure for an oral irrigator, comprising: the pump body, a piston ring, a connecting rod assembly, and a driving assembly;
the piston ring is arranged on an inner side wall of the pump body; the connecting rod assembly penetrates into the pump body and penetrates through the piston ring; the piston ring is in interference connection with the connecting rod assembly;
the connecting rod assembly is connected to the driving assembly, and is configured to make reciprocating motion in the pump body through the driving of the driving assembly and guidance of the piston ring;
the connecting rod assembly and the piston ring are configured to cooperate with each other to draw liquid from a water inlet of the pump body and to pump the liquid out from a water outlet of the pump body, during reciprocating motion of the connecting rod assembly; and
the piston ring comprises at least two guide rings and an outer ring, each of the at least two guide rings comprises a connection portion and an extension portion; the connection portion is connected to an inner side of the outer ring and the extension portion is configured to be extended towards an adjacent guide ring from an inner side of the connection portion; and an axial cross section of each of the at least two guide rings is L-shaped.

11. The oral irrigator according to claim 10, wherein
each of the at least two guide rings is in interference connection with the connecting rod assembly; and
the connecting rod assembly is configured to make the reciprocating motion in the pump body under guidance of the at least two guide rings.

12. The oral irrigator according to claim 10, wherein an inner diameter of the connecting rod assembly is smaller than an inner diameter of the pump body.

13. The oral irrigator according to claim 10, wherein
the connecting rod assembly comprises a first connecting rod and a second connecting rod;
one end of the first connecting rod is connected to an output end of the driving assembly and an other end of the first connecting rod is connected to an end part of the second connecting rod through a ball head;
the second connecting rod penetrates into the pump body and penetrates through the piston ring; and
the second connecting rod is in interference connection with the piston ring.

14. The oral irrigator according to claim 13, wherein
the ball head is arranged at an end part of the first connecting rod, a groove matched with a shape of the ball head is arranged at the end part of the second connecting rod, and the ball head is clamped in the groove;
or
the ball head is arranged at the end part of the second connecting rod, a groove matched with the shape of the ball head is arranged at an end part of the first connecting rod, and the ball head is clamped in the groove.

15. The oral irrigator according to claim 13, wherein
the driving assembly comprises: a motor, a motor gear, a transmission gear, and a cam;
the motor gear is fixed on an output shaft of the motor;
the transmission gear is in engaged connection with the motor gear;
the cam is fixed on an end face of the transmission gear; and
an end part of the first connecting rod is in transmission connection with the cam.

16. The oral irrigator according to claim 15, further comprising a steel sleeve, wherein the steel sleeve is arranged on the inner side wall of the pump body; and the connecting rod assembly is in sliding connection with the steel sleeve.

17. The oral irrigator according to claim 10, further comprising a steel sleeve, wherein the steel sleeve is arranged on the inner side wall of the pump body; and the connecting rod assembly is in sliding connection with the steel sleeve.

18. The oral irrigator according to claim 10, wherein the pump body comprises a first assembling piece and a second assembling piece;
the first assembling piece and the second assembling piece are of hollow cylinder structures, respectively;
the first assembling piece is connected to an end part of the second assembling piece;
the water outlet is formed at an end part of the second assembling piece away from the first assembling piece;
the water inlet is formed at a side of the second assembling piece;
a recessed portion is arranged on an end face of the first assembling piece facing towards the second assembling piece;
a protruded portion is arranged on an end face of the second assembling piece facing towards the first assembling piece; and
the piston ring and the protruded portion are arranged in the recessed portion respectively.

* * * * *